United States Patent [19]
Stewart et al.

[11] Patent Number: 5,694,013
[45] Date of Patent: Dec. 2, 1997

[54] FORCE FEEDBACK HAPTIC INTERFACE FOR A THREE-DIMENSIONAL CAD SURFACE

[75] Inventors: Paul J. Stewart; Yihan Chen, both of Ann Arbor, Mich.

[73] Assignee: Ford Global Technologies, Inc., Dearborn, Mich.

[21] Appl. No.: 709,570

[22] Filed: Sep. 6, 1996

[51] Int. Cl.$^6$ .............................. G05B 13/02; B25J 9/00
[52] U.S. Cl. ................. 318/561; 318/568.11; 345/156; 434/365; 901/9
[58] Field of Search ................... 318/561, 567, 318/568.1, 568.11; 345/156; 364/474.24; 395/118, 119, 127, 129, 788; 414/4, 5; 434/365, 369, 428; 901/9, 31, 32, 33, 34, 36

[56] References Cited

U.S. PATENT DOCUMENTS

| | | | |
|---|---|---|---|
| 3,919,691 | 11/1975 | Noll . | |
| 4,709,342 | 11/1987 | Hosoda et al. . | |
| 5,184,319 | 2/1993 | Kramer | 364/806 |
| 5,185,561 | 2/1993 | Good et al. | 318/432 |
| 5,237,647 | 8/1993 | Roberts et al. | 395/119 |
| 5,389,865 | 2/1995 | Jacobus et al. | 318/568.11 |
| 5,396,265 | 3/1995 | Ulrich et al. | 345/158 |
| 5,459,382 | 10/1995 | Jacobus et al. | 318/568.11 |
| 5,548,694 | 8/1996 | Frisken Gibson | 395/124 |
| 5,559,412 | 9/1996 | Schuler | 318/561 |
| 5,629,594 | 5/1997 | Jacobus et al. | 318/568.11 |

OTHER PUBLICATIONS

"A Magnetic Interface for Robot–Applied Virtual Forces" DSC–vol. 55–1, Dynamic Systems and Control: vol. 1 ASME 1994 (Luecke et al.).

"On The Development of a Force–Feedback Mouse and Its Integration Into a Graphical User Interface" DSC–vol. 55–1, Dynamic Systems and Control: vol. 1 ASME 1994 (Kelley et al.).

"Haptic Rendering: Programming Touch Interaction with Virtual Objects" 1995 Symposium on Interactive 3D raphics, Monterey, CA (Salisbury et al.).

"The Phantom Haptic Interface: A Device for Probing Virtual Objects" DSC–vol. 55–1, Dynmic Systems and Control: vol. 1 ASME 1994 (Massie et al.).

"Intermediate Representation for Stiff Virtual Objects" 1995 IEEE (Adachi et al.).

*Primary Examiner*—Bentsu Ro
*Attorney, Agent, or Firm*—David B. Kelley

[57] ABSTRACT

A method for providing a haptic interface between a user held physical device and a computer generated parametric surface determines if a collision has occurred therebetween. If a collision has occurred, a force to apply to the physical device is determined and a force actuation mechanism is activated so as to produce the force at the physical device. If a collision has not occurred, the force actuation mechanism is deactivated. The method is repeated as the physical device is moved through a virtual space in which the parametric surface is modeled. The physical device is capable of transmitting forces in at least three degrees-of-freedom via the force actuation mechanism which is connected thereto. A human operator holding the physical device can thus interact with the surface, which may be a CAD generated surface.

19 Claims, 8 Drawing Sheets

FORCE FEEDBACK HAPTIC INTERFACE FOR A THREE-DIMENSIONAL CAD SURFACE

FIELD OF THE INVENTION

The present invention relates generally to virtual reality haptic interfaces, and, more particularly, to a haptic interface for a three-dimensional computer-aided design (CAD) surface.

BACKGROUND OF THE INVENTION

Virtual Reality (VR) technologies are emerging to become an integral part of the next-generation interface tools for a wide spectrum of applications, particularly in entertainment, medical, aerospace, as well as the automotive industry. One rapidly growing area of these evolving technologies is the haptic interface—a type of VR interface which allow a user to tactilely encounter objects in a virtual environment. That is, the user can obtain the sensations of rigidity and facial roughness of virtual objects. In automotive styling, for instance, haptic interfaces would enable the designer to reach out, touch, and feel complex three-dimensional CAD geometry, thereby enhancing shape perception to the level that is, perhaps, only challenged by a physical prototype. Other potential applications include, but are not limited to, vehicle interior design in which haptic interfaces would allow easy verification of the accessibility and ease-of-reach of instrument panel buttons and control knobs, and dealership presentations in which customers could form a sense of intimacy of the vehicle's interior by touching and feeling the texture of virtual seat fabrics, etc.

The core of a haptic interface system includes (1) methods to compute reaction forces as a result of touching and pushing a virtual object (based on the location of the user's hand relative to the object in virtual space), and (2) hardware, typically a robot arm or exoskeleton type of device that delivers the computed force to the user through its end-effector, normally, the place where the user grabs. There is a variety of haptic interface hardware available on market. Unfortunately, the methods available to model and compute reaction forces are very limited and only valid for objects that are relatively simple in shape and in mathematical representation. These objects must be closed algebraic surfaces, such as spheres, solids with boundaries defined by algebraic surfaces, such as and cubes, or a combination of both. In reality, however, CAD geometry is much more complicated. In particular, automotive body surfaces, are created, stored, and exchanged predominantly in the form of bounded, open, and piecewise parametric free-form surfaces. Thus, to incorporate the haptic interface in the automotive surface design process, there is an inevitable and urgent need to develop new methods to permit human interaction with these complicated free-form surfaces.

SUMMARY OF THE INVENTION

In response to the needs of the industry, the present invention provides a haptic interface between a physical device and a computer generated parametric surface separating a virtual space into two virtual half spaces. The physical device, for example a space pen, is capable of transmitting forces in at least three degrees-of-freedom via a force actuation mechanism connected thereto. As the physical device is moved through the virtual space, a plurality of device points are defined representing the path of the physical device. Interaction of the physical device with the parametric surface is determined by first determining whether a collision has occurred between a device point and the parametric surface. If a collision has occurred, a force to apply to the physical device is determined and the force actuation mechanism is activated so as to produce the force at the physical device. If a collision has not occurred, the force actuation mechanism is deactivated. The method is repeated in real-time for each of the plurality of device points as the physical device is moved through the virtual space. A human operator holding the physical device can thus physically interact with the surface, which can be CAD generated.

In a preferred embodiment, the force actuation mechanism is deactivated if a minimization point on the parametric surface which minimizes the distance between a device point and the parametric surface is a boundary point, if the device point is outside of a predetermined elasticity zone around the parametric surface, or if the device point is separated from the parametric surface. If the device point has moved along the parametric surface, or if the device point has passed through the parametric surface, a force to apply to the physical device is determined and the force actuation mechanism is activated so as to produce the force at the physical device. This is done for each of the plurality of device points. The force preferably has two components, a normal force and a shear force, calculated based on rigidity and friction properties assigned to the surface being modeled.

An advantage of the present invention is a method for providing a haptic interface which is capable of interacting with the general parametric free-form surfaces widely used in automotive industries.

Another advantage of the present invention is a method which can be used with bounded surfaces of a CAD generated surface to allow a user to haptically interact with the edges of a surface and touch it freely from both sides.

BRIEF DESCRIPTION OF THE DRAWINGS

These and other objects, advantages and features of the present invention will be apparent to those skilled in the art upon reading the following description with reference to the accompanying drawings, in which.

DETAILED DESCRIPTION OF THE PREFERRED EMBODIMENT

Figure 1:
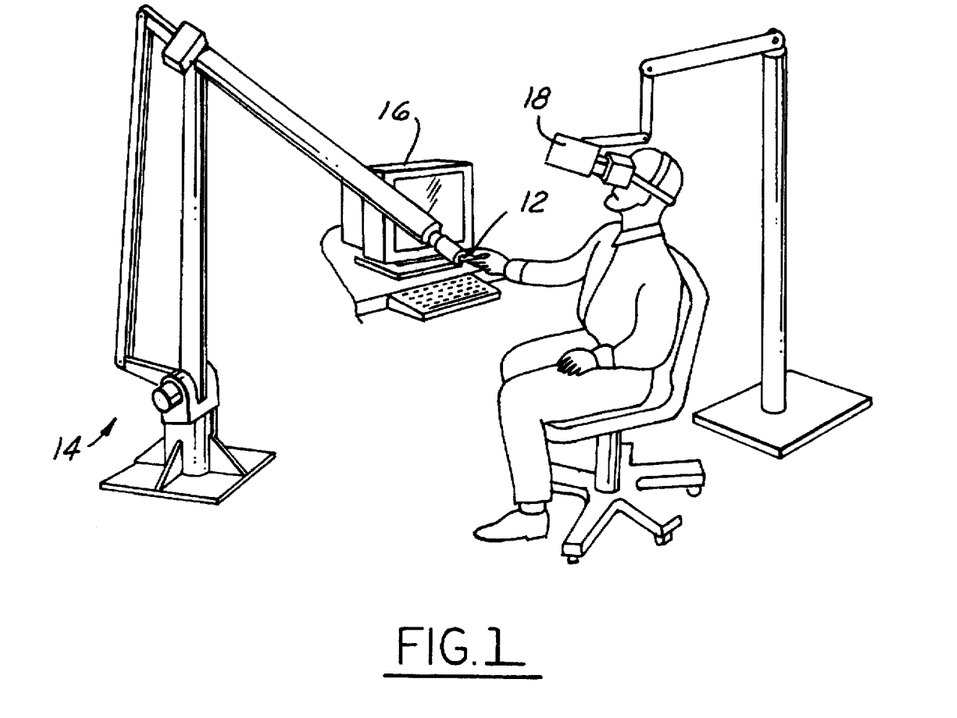
FIG. 1 is a perspective view of a human operator grasping a physical device, connected to a force actuation mechanism, for providing a haptic interface to a computer generated parametric surface.
Figure 2:
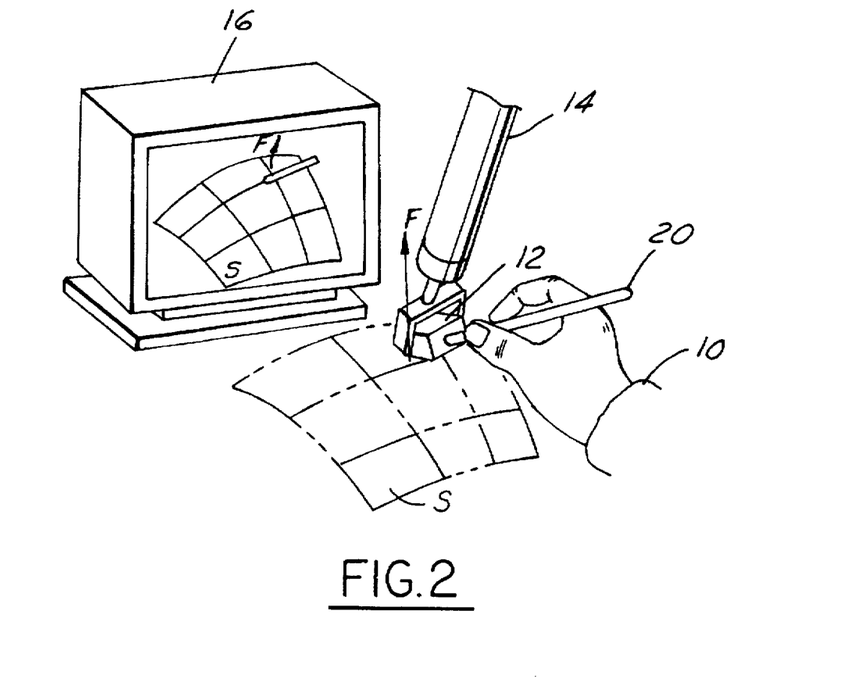
FIG. 2 is a perspective view of a human hand holding a physical device which provides a haptic interface with a surface S in a virtual space, the surface S representing a computer generated surface.

Turning now to the drawings, and in particular to FIG. 1 thereof, a human operator 10 is seen grasping a physical device 12, which is connected to a force actuation mechanism 14. The force actuation mechanism 14 is electrically connected to a design station, which includes a computer and display screen 16 for generating a design form, typically through use of conventional CAD, CAM or CAE programs. For purposes of this disclosure, the abbreviation "CAD" will be considered to encompass computer assisted design programs, including those from computer-aided manufacturing (CAM) and computer-aided engineering (CAE) facilities. The design form can be a surface S which is displayed on the screen 16 (FIG. 2), or can be viewed in a virtual reality viewing device 18 which attaches directly to the head of the human operator 10 (FIG. 1). As best seen in FIG. 2, a haptic interface for generating the sensations of rigidity and facial roughness of virtual objects, such as the surface S, is provided through the physical device 12, which can be a space pen 20 attached to the physical device 12. In automotive styling, for instance, the physical device 12 and space pen 20, in conjunction with the haptic interface method of the present invention, enable the designer to touch and feel complex, three-dimensional CAD geometry, thereby enhancing shape perception to the level that is, perhaps, only challenged by a physical prototype.

Figure 3:
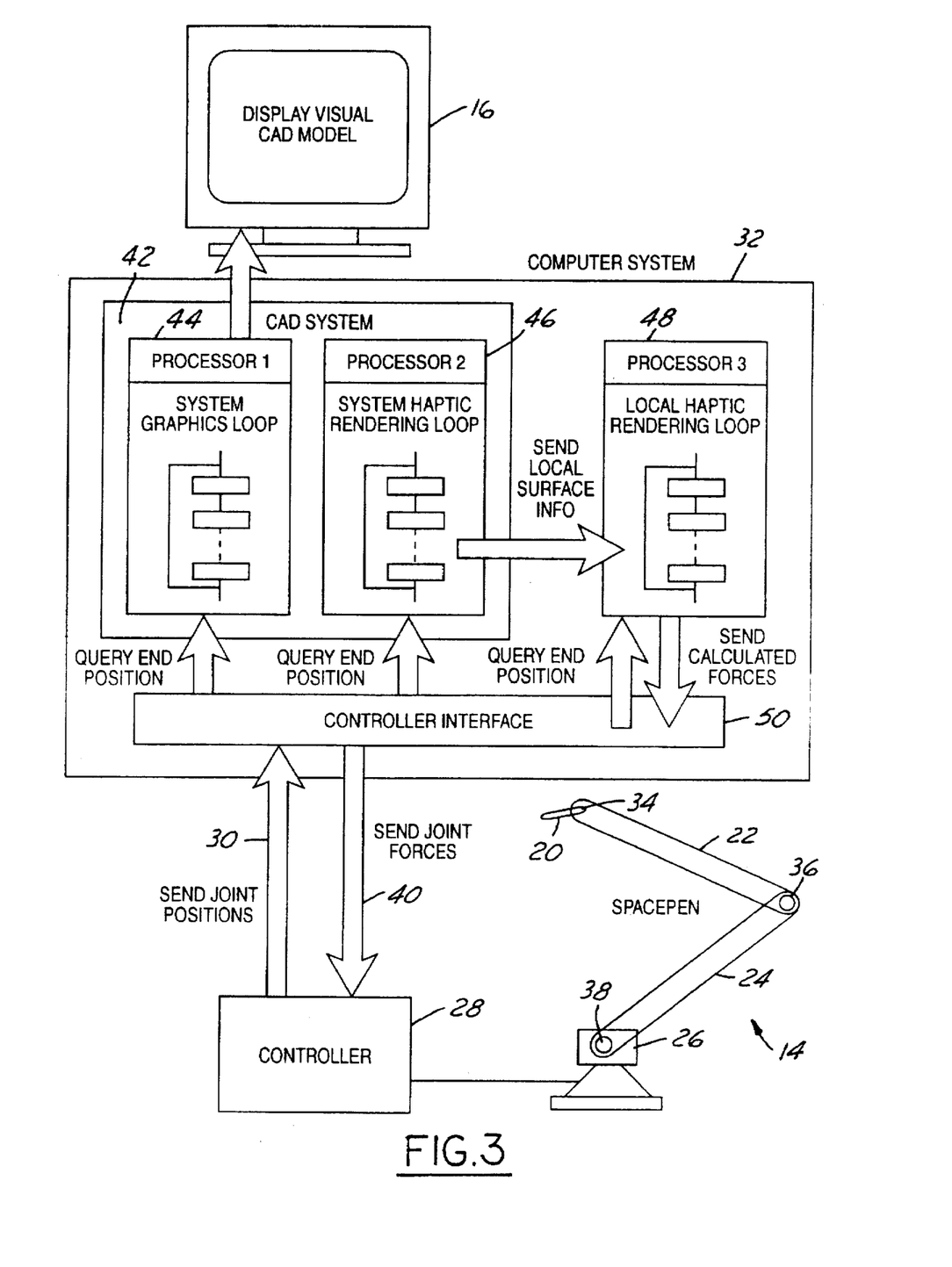
FIG. 3 is a schematic representation of a system for using a method of generating a haptic interface with a parametric surface according to an embodiment of the present invention.

Referring now to FIG. 3, hardware for a system to provide the haptic interface to a CAD surface is shown. Beginning at the lower right of FIG. 3, the force actuation mechanism 14 has the space pen 20 attached to an upper arm 22, which in turn is attached to a lower arm 24. The lower arm 24 is joined to a servo-controller 26, or other device known to those skilled in the art and suggested by this disclosure, capable of transmitting forces to the space pen 20 through the upper and lower arms 22, 24, in at least three degrees-of-freedom. A controller 28 sends signals 30 to an electronic computer 32, the signals 30 representing joints positions 34, 36, and 38, for the joints between the space pen 20 and the upper arm 22, the upper arm 22 and the lower arm 24, and the lower arm 24 and the servo-controller 26, respectively. The computer 32 sends joint force signals 40 to the controller 28, which in turn controls the servo-controller 26 to produce the required forces at the space pen 20.

Still referring to FIG. 3, the computer 32 preferably has a CAD system 42 therein comprised of a system graphics loop processor 44 for controlling display of a CAD surface on the screen display 16 and a system haptic rendering loop processor 46 for calculating the geometric parameters needed for haptic display. The computer 32 has a local haptic rendering loop processor 48 to control the space pen 20, according to the current parameters. A controller interface 50 provides communication between the processors 44, 46, 48 and the controller 28. Those skilled in the art will recognize that the system of FIG. 3 is but one of many which may be used to implement haptic interface method of the present invention, and that the present invention is not intended to be limited to that shown in FIG. 3.

The preferred method has two procedures: force actuation check and force calculation. The force actuation check determines when a force must be generated at the physical device 12, while the force calculation determines numerical values of the magnitude and direction of the force to be generated. The decision to actuate a force at the physical device 12 is determined by an occurrence of spatial impedance, or a virtual collision, between the device point P and the surface S, as the device point P moves in the space V.

Figure 4A:
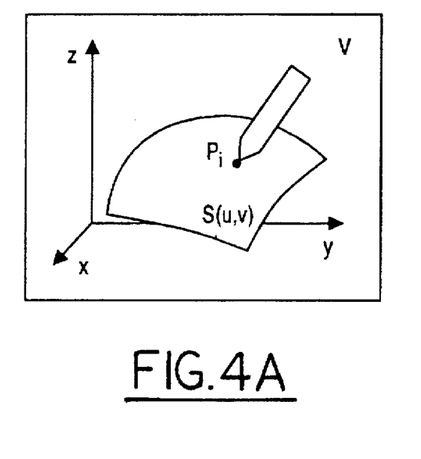
FIG. 4A is a perspective view of a virtual space V in three dimensions having a parametric surface S defined therein.

Before turning to a more detailed discussion of the haptic interface of the present invention, it may be helpful to define some terminology that will be used in describing the method, with reference to FIGS. 4A, 4B, 4C, 5A and 5B. In FIG. 4A, a virtual space V in three dimensions has a parametric surface S and a device point P representing a movable position, such as an operator's finger tip or the tip of the space pen 20. The surface S is a free-form, parametric surface patch, represented in two variables as $S(u, v)$, as opposed to an algebraic surface which is closed, such as a sphere, or a planar surface with infinite extension. The surface S is treated as an undeformable geometry. A collection of device points, $P_i$ (where $i=0, 1, \ldots n$) represents a path of the tip of the space pen 20 in a given period of time as it is moved in the virtual space V.

Figure 4B:
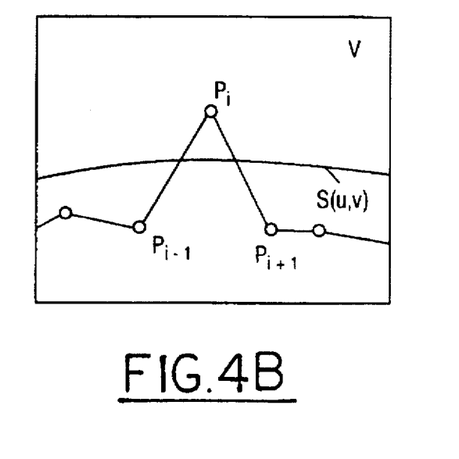
FIG. 4B is side view of a virtual space V having an unbounded parametric surface S.

As a general case, the surface S has infinite extension and thus divides the space V into two separate subspaces (FIG. 4B). The device point P can move freely in either subspace as long as movement is completely contained within the subspace in which the physical device 12, and thus the device point P, is located at the beginning of the operation, that is, at a time step of zero (0). When the device point P travels from one subspace to the other, as illustrated in FIG. 4B, a collision occurs, and a force is actuated to resist further movement. Identification of this collision can be accomplished by checking a signed distance between the device point P and the surface S, as is further explained below.

Figure 4C:
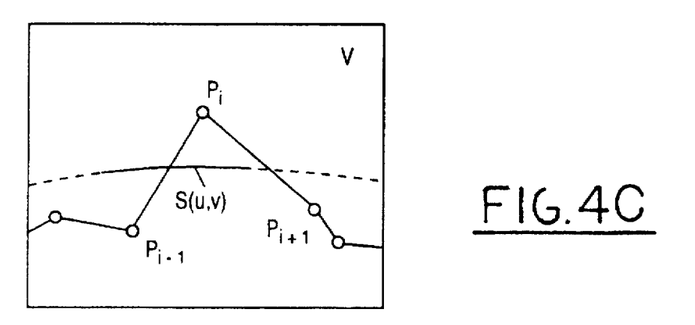
FIG. 4C is side view of a virtual space V similar to FIG. 4B but having a bounded parametric surface S.

For a surface with limited extension, for example a CAD generated parametric surface S as shown in FIG. 4C, additional collision checking is required since the surface S does not represent the complete boundary that separates the two subspaces. The force actuation thus requires a determination of whether crossing between subspaces is indeed on the surface S, as illustrated in FIG. 4C. The device point P can travel on either side of the surface S, and probe the edges thereof.

Figure 5A:
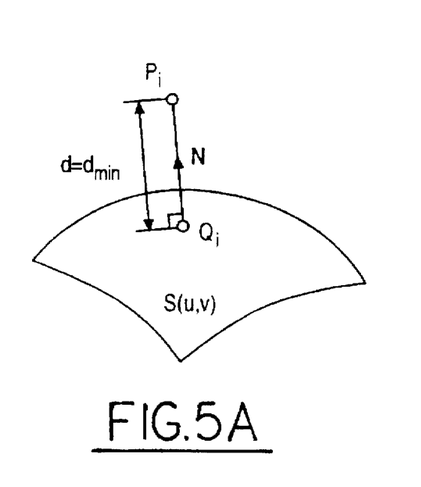
FIG. 5A is perspective view of a parametric surface showing a minimization point and a distance of a device point with respect to the surface.
Figure 5B:
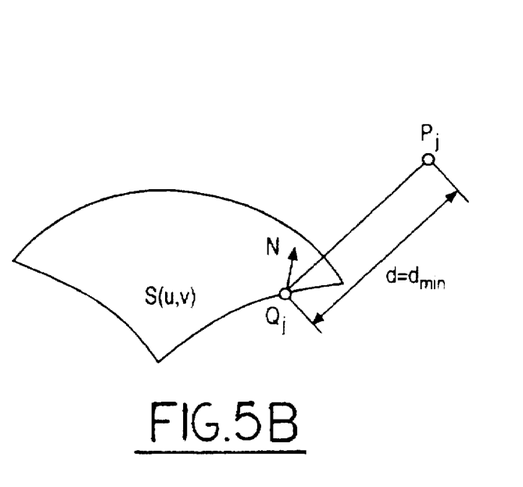
FIG. 5B is perspective view of a parametric surface showing a boundary point and a distance of a device point with respect to the surface.

Referring to FIG. 5A, for each device point $P_i$ it can be shown that there is a minimization point $Q_i$ on the surface S for which the distance between the points $P_i$ and $Q_i$ is minimized. This distance is called an oriented distance, d, and is defined as the distance between the device point $P_i$ and the parametric surface S in which a vector N coincident with the oriented distance, d, is normal to the parametric surface at the point $Q_i$. The oriented distance, d, has a device point sign associated therewith, either positive (+) or negative (−), to signify a virtual half space in which the device point $P_i$ is located. A previous device point, $P_{i-1}$, the device point immediately preceding the device point $P_i$, has a previous device point sign. Since the surface S is bounded, there are device points $P_j$ for which the oriented distance, d, does not lie along a normal vector to the surface S, but rather is between $P_j$ and a minimization point $Q_j$ along a boundary of the surface S, as shown in FIG. 5B. The minimization point $Q_j$ is called a boundary point. Determination of the minimization points $Q_i$ and $Q_j$ for any device point P is accomplished by solving a problem of which the objective is to minimize the distance between the device points P and the bounded surface S.

Figure 6:
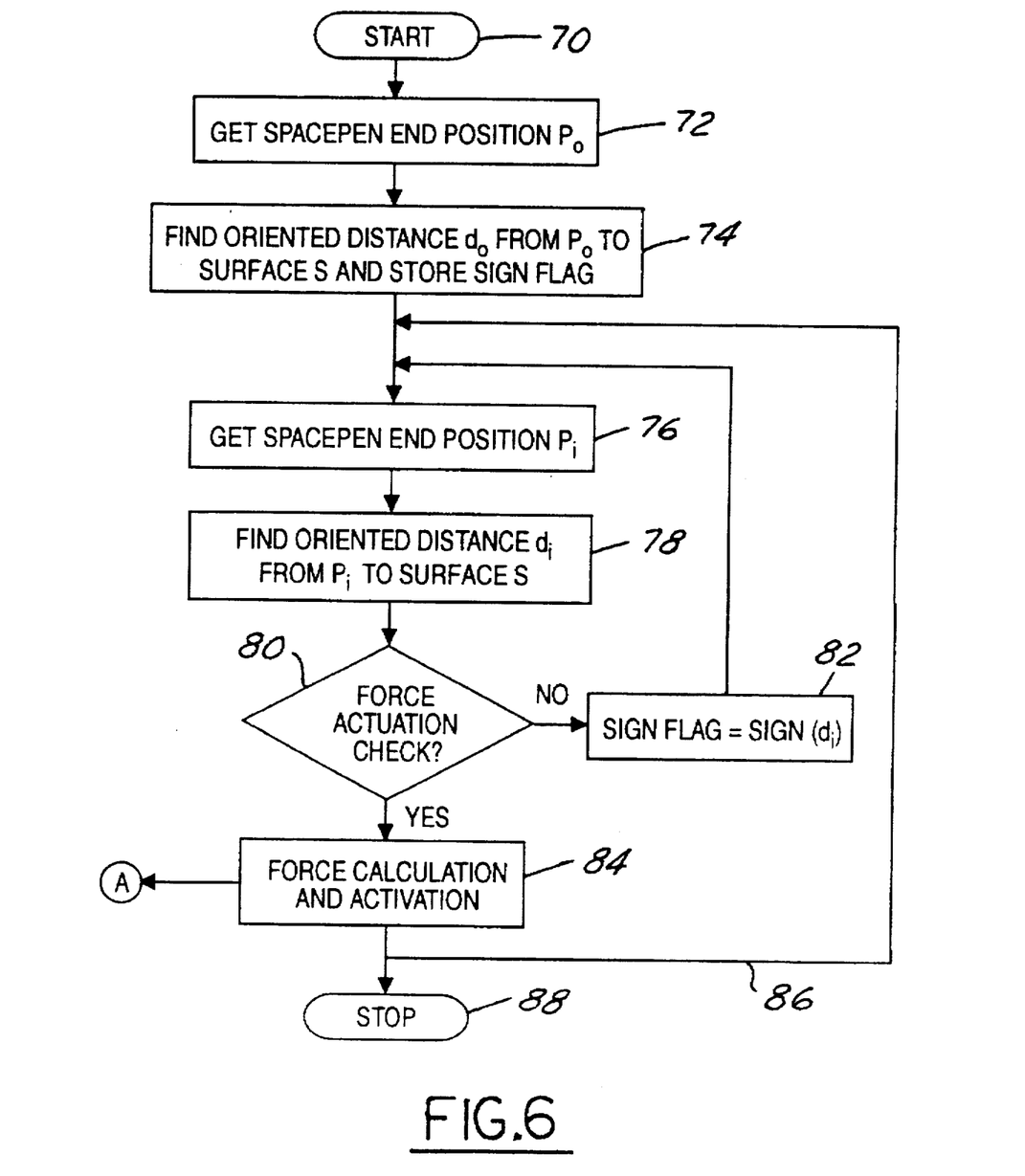
FIG. 6 is a flowchart of a method for providing a haptic interface according to an embodiment of the present invention.

With the foregoing in mind, a haptic interface method to model force feedback from parametric free-form surfaces will now be described. A flow diagram showing the steps leading to the force actuation check is shown in FIG. 6. Beginning at the top, the system is started in box 70, an initial position $P_o$ of the space pen 20 is retrieved in box 72, and an oriented distance $d_0$ is determined in box 74 for the point $P_o$. A sign flag is also stored in box 74 indicating the virtual half plane in which the initial device point $P_o$ lies. This sign flag is updated as the space pen 20 is moved through the virtual space V, as is further described below.

After the initialization steps of boxes 70, 72 and 74, the steps in boxes 76 and 78, and the force actuation check in diamond 80, are performed sequentially for each device point $P_i$ as the space pen 20 is moved through the virtual space V. In the box 76, the position $P_i$ of the space pen 20 is retrieved, and an oriented distance $d_i$ is determined in box 78.

A force actuation check is made in diamond 80 which, as further explained below, is based on collisions between the parametric surface S and the device point P. If no collision has occurred, the sign flag is changed to be the same sign as the oriented distance $d_i$. The next device point $P_i$ is then obtained. If a collision has occurred, an appropriate force is determined to represent the collision, and the forced actuation mechanism 14 is activated, as further discussed below. The next device point P is then obtained, as indicated by the return line 86, and the method is performed again for each subsequent device point P, until the procedure is stopped in box 88.

Figure 7:
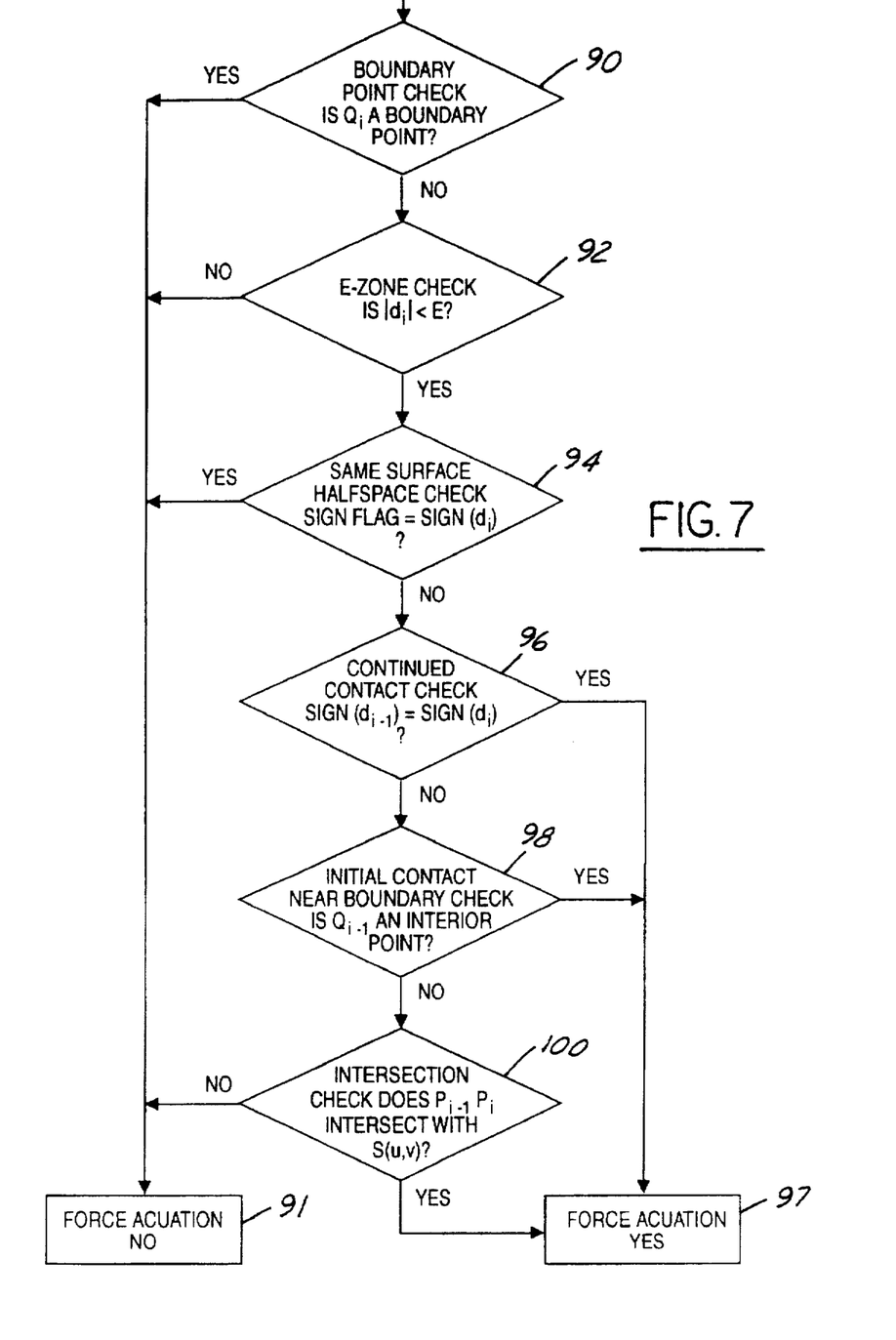
FIG. 7 is a flowchart showing a force actuation check according to an embodiment of the present invention.

Turning now to FIG. 7, the force actuation check is shown in a flow chart fashion. As an initial inquiry, a check is made to determine if the minimization point $Q_i$ is a boundary point of the surface S. If $Q_i$ is a boundary point, then no collision has occurred and, therefore, no force actuation is required. The method then returns to box 82 in FIG. 6.

If $Q_i$ is not a boundary point, an E-Zone check is made in diamond 92 (FIG. 7). The E-Zone, as used herein, is a predetermined space within a predefined elasticity distance from the surface S in an opposite virtual half space from that of the device point P. If the oriented distance of the device point $P_i$ is outside of the E-Zone, (if $D_i$ is outside the E-zone) then no force actuation is required since a collision has not occurred, and the method continues with box 82 in FIG. 6. The E-Zone check can be represented as a $|d_i|<E$, where $d_i$ is the oriented distance for $P_i$ and E is the predetermined elasticity distance. In a physical sense, the E-Zone defines the maximum elasticity of the surface when encountered by the physical device.

If the device point $P_i$ is within the E-Zone, then a surface half space check is performed in diamond 94. If the oriented distance $d_i$ has the same sign as the sign flag, then no force actuation is required since this indicates the device point $P_2$ is still on the same side of the surface from which the device began and is not in contact with the surface.

However, if the signs are different, then a continued contact check is carried out in diamond 96 (FIG. 7). This check determines whether previous contact between the device $P_i$ is continuing from the previous device point $P_{i-1}$. In a physical sense, this check determines whether the physical device, or an operator's finger, is being moved over the surface S. The check is carried out by comparing the sign of the oriented distance $d_{i-1}$ to the sign of the oriented distance $d_i$. If the signs are the same, then force actuation is required as indicated in box 97 and the method returns to determine the force calculation and activation in box 84 of FIG. 6.

If the signs are different, however, then an initial contact near the surface boundary check is carried out in diamond 98 (FIG. 7). In this check, the minimization point $Q_{i-1}$ of the previous device point $P_{i-1}$ is checked to determine whether it is an interior point. An interior point, as used in this disclosure, is a point which is not a boundary point as defined above. The purpose of this check is to avoid the complex calculations required for boundary points in diamond 100, if the point is known to be on the interior of the surface. If the minimization point $Q_{i-1}$ is an interior point, then force actuation is required and the process moves to box 97. However, if $Q_{i-1}$ is not an interior point, then a final intersection check is performed in diamond 100.

In the intersection check, a collision is determined by constructing a line segment between the previous device point $P_{i-1}$ and the current device point $P_i$. If the line segment $P_{i-1} P_i$ intersects the surface S, then a collision has occurred and force actuation is required. The process then moves to box 84 of FIG. 6. If the line segment $P_{i-1} P_i$ does not intersect the surface S, then no force actuation is required and the method returns to box 82 of FIG. 6.

Figure 8:
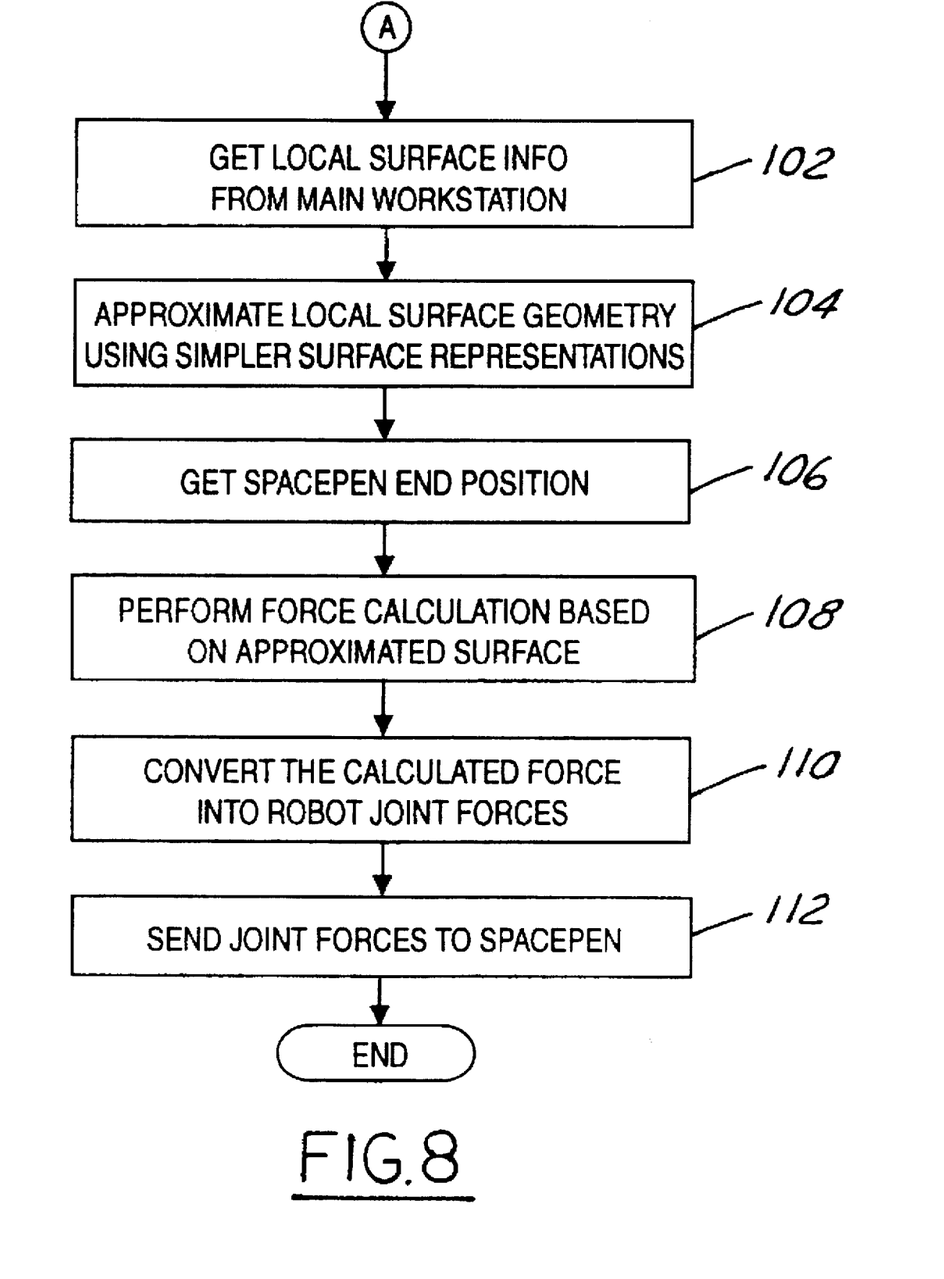
FIG. 8 is a flow chart of a force calculation according to an embodiment of the present invention.
Figure 9:
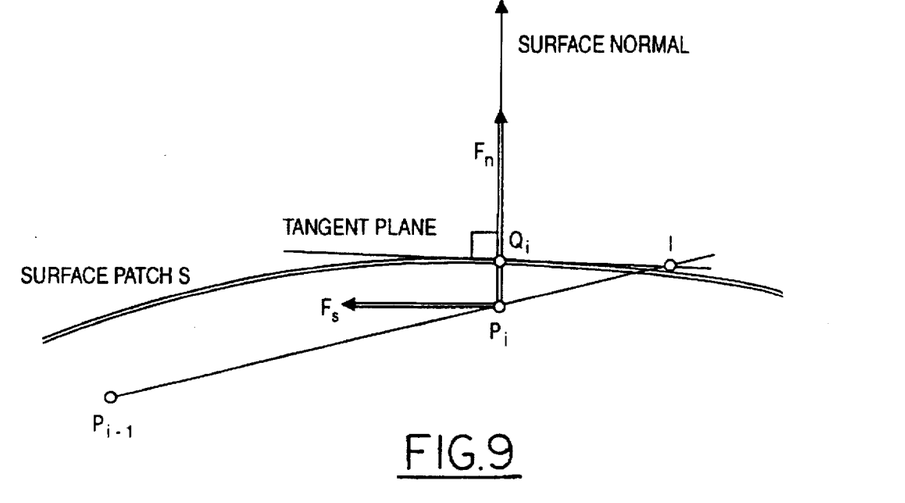
FIG. 9 is diagram of normal and shear force components for a device point when interacting with a parametric surface.

Turning now to the force calculation and activation portion of the method, FIG. 8 shows the preferred steps in carrying out this function. Beginning with box 102, local surface information for the surface S is obtained, and in box 104 an approximation of the local surface geometry is made using simpler surface representations. This latter step in box 104 is preferred since the local haptics loop 48 can work efficiently with the simpler representations while the system haptic loop 46 derives the next set of haptic parameters. In box 106, the device point $P_i$ is obtained. A force calculation can then be made, preferably based upon a model depicted in FIG. 9. According to this model, two types of forces are calculated: A normal force $F_n$ and a sheer force $F_s$. The normal force has a direction defined by a vector N normal to the point $Q_i$ on the surface S. The magnitude of the normal force $F_n$ can be, for example, proportional to the distance between the device point $P_i$ and the surface S. In FIG. 9, the device point $P_i$ is on an opposite side of the surface S which is a convention for the method of the present invention to indicate that a force should be generated. In other words, as further explained below, a force is not generated on the physical device until the device point $P_i$ has actually passed through the surface S.

Figure 11:
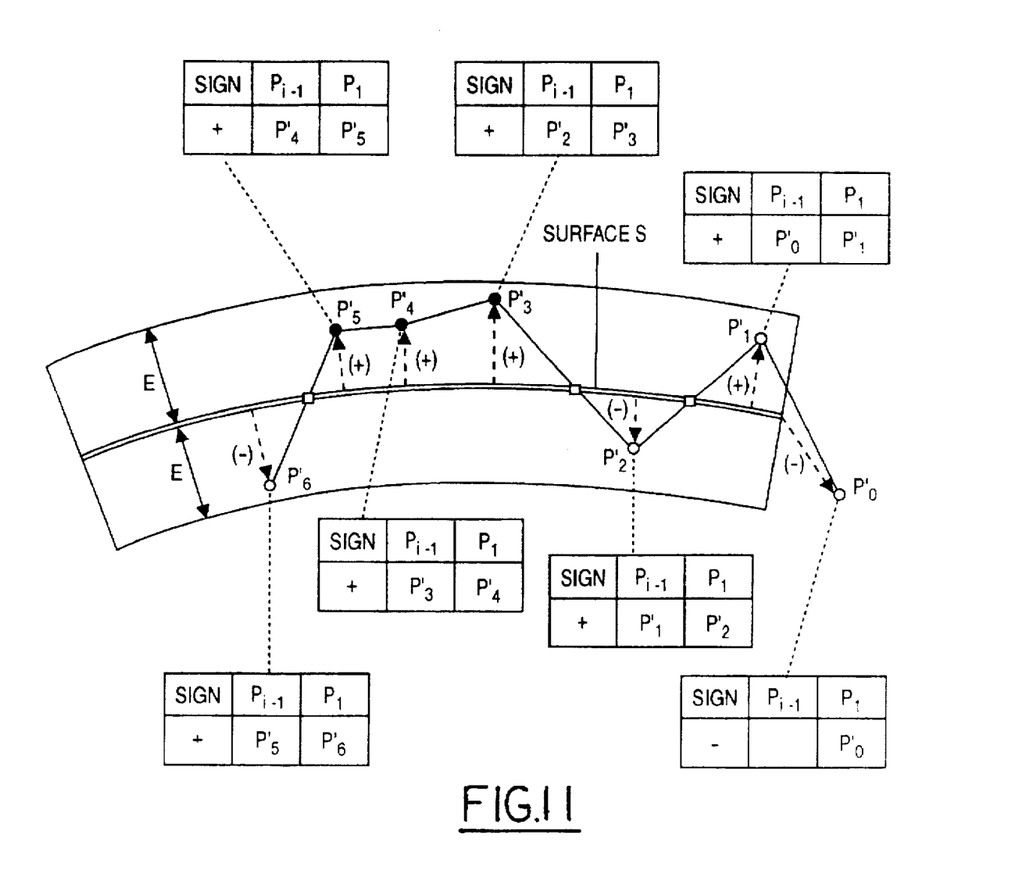
FIG. 11 is a schematic diagram similar to FIG. 10 but showing a second example of a device point as it traverses a path in the virtual space in relation to the parametric surface.

Continuing with FIG. 9, the sheer force $F_s$ is a vector which lies in a plain tangent to the surface S at the point $Q_i$ with a direction given by connecting two points, one point being $Q_i$, and the other is the intersection between a line defined by the device point $P_i$ and the previous device point $P_{ii}$, and tangent plane to Q. The intersection is indicated in FIG. 11 as intersection point I. Further, the direction of the sheer force $F_s$, that is whether it points to the minimization point $Q_i$ or the intersection point I depends on which vector, $Q_i$-I or I-$Q_i$, forms a smaller angle with the vector $P_{i-1}$-$P_i$. The magnitude of the sheer force $F_s$ is that of the normal force $F_n$ multiplied by a friction coefficient. The friction coefficient will vary depending on the nature of the surface S. Those skilled in the art will recognize that the normal force $F_n$ reflects the rigidity of the surface S and the sheer force $F_s$ represents the friction of the surface S. Returning to FIG. 8, in box 110 the calculated forces are converted in joint forces for application to the joints 34, 36, 38 of the force actuation mechanism 14. In box 112, these joint forces are then sent to the force actuation mechanism 14. The force calculation and actuation sequence is then completed and the method returns to box 84 of FIG. 6, and to return line 86 if more device points must be processed, or to box 88 if the process has stopped.

Figure 10:
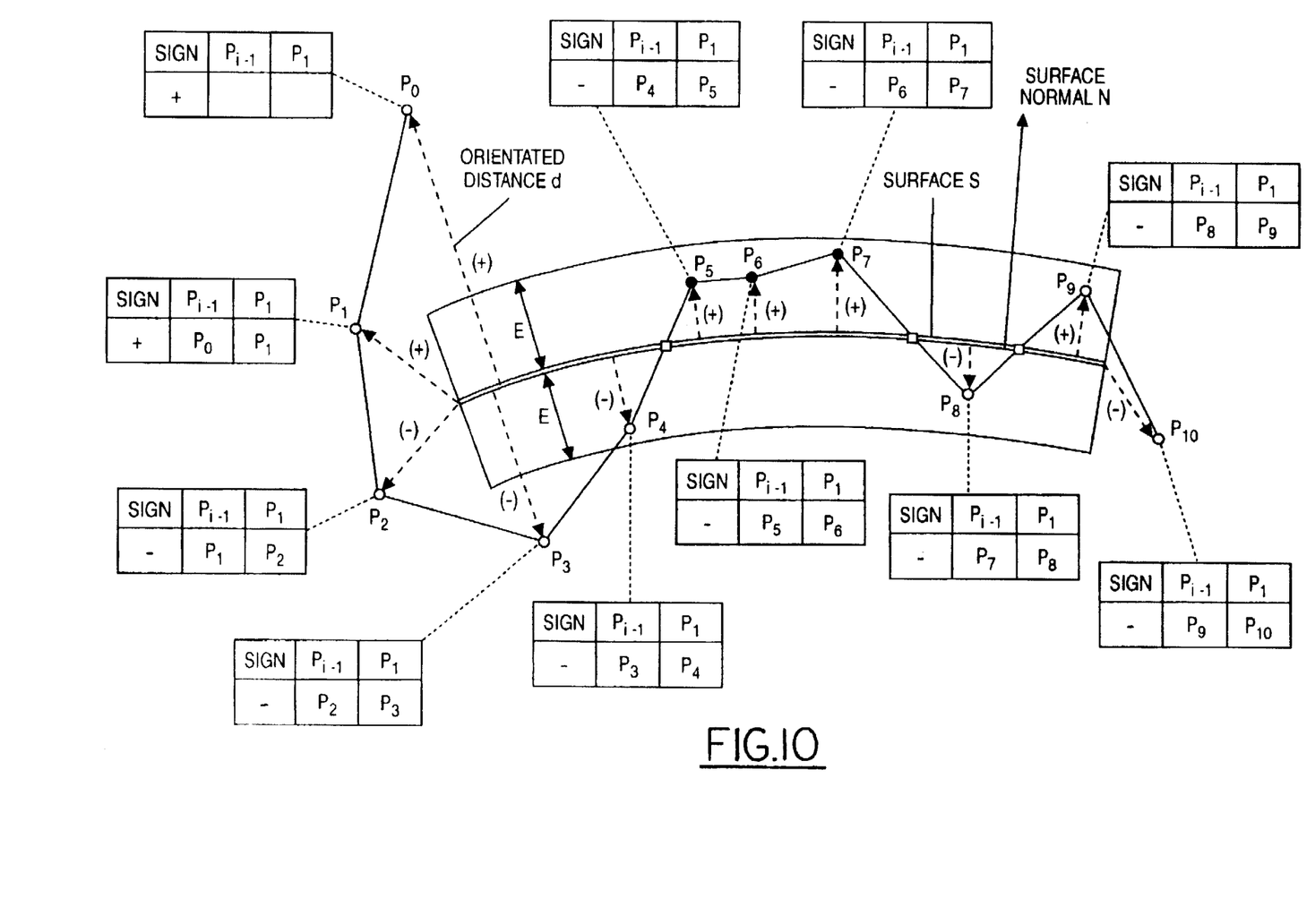
FIG. 10 is a schematic diagram showing a sample path of a device point as it traverses a path in the virtual space in relation to a parametric surface according to an embodiment of the present invention.

The method of the present invention, and in particular the force actuation check, can be demonstrated with reference to FIG. 10. For purposes of FIG. 10, the half space above surface S will be assigned a positive (+) sign, and the half space below the surface S will be negative (−). In FIG. 12, a series of device points P represent movement of a physical device 20 (not shown) from above the surface S, around the left end thereof, to an underside which is probed, and finally to the right side. For each device point $P_i$, an oriented distance is depicted and as a dotted line with an arrow pointing to the device point. Next to the oriented distance is a sign (indicating the sign of the oriented distance d). Finally, for each device point $P_i$, a table containing the sign flag, represented merely as "sign", the previous device point $P_{i-1}$, and the current device point $P_i$.

Beginning with the device point $P_0$, which can be assumed, without losing generality, to be located off the surface S, an oriented distance is calculated and determined to have a positive (+) sign. The physical device is then moved to the device point $P_1$ at which time the boundary point check of decision diamond 90 of FIG. 7 is performed. Since the point which minimizes the distance between device point $P_1$ and the surface S is a boundary point, no force actuation is required (box 91) and the sign flag is changed to be that of the current device point $P_1$, which is again positive (+). As the physical device is moved to device point $P_2$, the steps of FIG. 7 are performed. Beginning in diamond decision 90, it can be seen that the device point $P_2$ has a minimization point which, like the previous device point $P_1$, is a boundary point. As such, no force actuation is required, but unlike the previous device point $P_1$, the sign flag is changed from a positive (+) to a negative (−). For the device point $P_3$, the boundary point check is negative since the point which minimizes the distance between device point $P_3$ in the surface S is not a boundary point. Thus, the E-Zone check of decision diamond 92 is performed wherein it is seen that the device point $P_3$ is outside of the predetermined elasticity distance E from the surface S. That is, the absolute value of the oriented distance $d_3$ is greater than the predetermined elasticity distance E. As such, no force actuation is required and the sign flag is updated to reflect the sign of the current device point $P_3$, which is negative (−).

Moving to device point $P_4$, it is seen that the minimization point therefore is not a boundary point, and also that the point is within the E-Zone. Therefore, the decision diamond 94, which checks whether the sign of the oriented distance $d_4$ is the same as the sign flag is performed. It is readily seen that since the sign flag is the same as the sign of the oriented distance $d_4$, no force actuation is required and the sign flag is updated to reflect that of the current device point $P_4$.

Continuing with device point $P_5$, it is readily seen that the boundary point check and the E-Zone check do not prevent force actuation. In addition, since the sign flag, which is negative (−), is different than the sign of the oriented distance $d_5$, which is positive (+), the same surface half space check of decision diamond 94 does not prevent force actuation. As such, the continued contact check of decision diamond 96 of FIG. 7 is performed which turns out to be "no" since the sign of the previous oriented distance $d_4$, which is negative (−), is not equal to the sign of the oriented distance $d_5$, which is positive (+). Next, the minimization point $Q_{i-1}$, is checked to determine whether it is an interior point. If so, then force actuation is initiated in box 97, as is the case for the device point $P_5$. For the device point $P_6$, force actuation is not prevented by the boundary point check, the E-Zone check, or the same surface half space check. In the continued contact check, however, force actuation is determined to be required since the sign of the oriented distance $d_5$ (+) is equal to the sign of the oriented distance $d_6$ (+). The same result is reached for device point $P_7$. It is seen, then, that the device points $P_5$, $P_6$, and $P_7$ represent the situation when the physical device 20, or an operators finger, is run along the underside of the surface S. For each of those device points, a normal force representing the rigidity of the surface S and a sheer force representing the friction of the surface S are determined as previously discussed above.

Looking at device point $P_8$, it will be seen from FIGS. 7 and 10 that the boundary point check and the E-Zone check do not result in force actuation. However, in the same-surface half-space check, the sign flag (−) is the same as the sign of the oriented distance $d_7$(−). As such, no force actuation is required and the force actuation mechanism is deactivated. This results since the physical device has moved under the surface S, which is being probed from below. As the physical device moves once again through the surface S to the device point $P_9$, it will be seen that the decision diamonds 90, 92, 94 and 96 do not lead to the "no force actuation" box 91 or to the "force actuation" box 97. In the decision diamond 98, the minimization point of the previous device point $P_8$ is an interior point, and thus force actuation is required. This is an important step since the intersection check of decision diamond 100 (FIG. 7) would otherwise be required, which is a computationally expensive step, that is, one which requires significantly greater computer resources than the previous five decision diamonds 90–98. For this reason, the intersection check of decision diamond 100 is preferably avoided.

Considering the final device point $P_{10}$, it is seen that the minimization point is a boundary point and thus no force actuation is required.

A further example is given in FIG. 11 to illustrate the force actuation check of the present invention, particularly the intersection check diamond 100 (FIG. 9). The example of FIG. 11 essentially traverses the same path of FIG. 10, except in a reverse direction, and the device point subscripts have been changed, in addition to adding a prime mark ('). Beginning with the device point $P'_1$, in the decision diamond 90 of FIG. 7 the boundary point check is negative, the E-Zone check is "yes", the same surface half space check is "no", since the sign flag is negative (−) and the sign of the oriented distance $d_1$ is positive (+). In the decision diamond 96, the continued contact check is "no" since the signs of the oriented distances of device points $P'_0$ and $P'_1$ are not equal. In the decision diamond 98, the initial contact near boundary check, the result is "no" since the minimization point for a device point $P'_0$ is indeed a boundary point, and not an interior point. This brings us to the intersection check of decision diamond 100, where it is seen from FIG. 11 that the result of this check is "no" since the line segment $P'_0 P'_1$ does not intersect the surface S. Thus, no force actuation is required and the sign flag is changed from (−) to (+).

Application of the present invention to the subsequent device points $P'_2-P'_6$ are analyzed similarly to the analysis of FIG. 10. In particular, device points $P'_2$ and $P'_6$ require force actuation, whereas device points $P'_3-P'_5$ do not require force actuation. This scenario represents movement above the surface S with surface contact at device points $P'_2$ and $P'_6$.

Those skilled in the art will appreciate that the force actuation check of the present invention provides a computationally efficient process for providing a haptic interface with a CAD surface. In particular, the intersection check of decision diamond 100 of FIG. 7 is kept to a minimum.

Although the preferred embodiment of the present invention has been disclosed, various changes and modifications may be made without departing from the scope of the invention as set forth in the appended claims.

We claim:

1. A method for providing a haptic interface between a physical device and a computer generated parametric surface separating a virtual space into two virtual half spaces, the physical device capable of transmitting forces in at least three degrees-of-freedom via a force actuation mechanism connected thereto and defining a plurality of device points when moved through the virtual space, the method comprising the steps of, for each of the plurality of device points:

(i) deactivating the force actuation mechanism and proceeding to a next of the plurality of device points if a minimization point on the parametric surface which minimizes the distance between a device point and the parametric surface is a boundary point;

(ii) deactivating the force actuation mechanism and proceeding to a next of the plurality of device points if the device point is outside of a predetermined elasticity zone around the parametric surface;

(iii) deactivating the force actuation mechanism and proceeding to a next of the plurality of device points if the device point is separated from the parametric surface;

(iv) determining a force to apply to the physical device, activating the force actuation mechanism so as to produce the force at the physical device, and proceeding to a next of the plurality of device points if the device point has moved along the parametric surface; and (v) determining a force to apply to the physical device, activating the force actuation mechanism so as to produce the force at the physical device, and proceeding to a next of the plurality of device points if the device point has passed through the parametric surface.

2. A method for providing a haptic interface as defined in claim 1 wherein an oriented distance, defined as a distance between the device point and the parametric surface in which a vector representing said oriented distance is normal to said parametric surface, has a device point sign associated therewith to signify a virtual half plane in which the device point is located, and a previous device point, having a previous device point sign, is the one of the plurality of device points immediately preceding the device point.

3. A method for providing a haptic interface as defined in claim 2 wherein in step (i) said minimization point is determined by finding a point on the parametric surface which represents the shortest distance between the device point and the parametric surface.

4. A method for providing a haptic interface as defined in claim 2 wherein step (ii) further comprises comparing an oriented distance of the device point, relative to the parametric surface, to a predefined elasticity distance, said elasticity zone being a predetermined space within said predefined elasticity distance from the parametric surface on an opposite virtual half space from that of the device point.

5. A method for providing a haptic interface as defined in claim 2 wherein in step (iii) a half space indicator flag containing a sign indicating the virtual half space from which the device point was previously in is compared to the device point sign of the oriented distance of the device point.

6. A method for providing a haptic interface as defined in claim 2 wherein in step (iv) the sign of the oriented distance is compared to the sign of a previous oriented distance of said previous device point to determine whether said device point has moved along said parametric surface.

7. A method for providing a haptic interface as defined in claim 1 wherein in step (v) determination of whether said device point has passed through said parametric surface is accomplished by constructing a line segment between said device point and said previous device point and determining whether said line segment intersects said parametric surface.

8. A method for providing a haptic interface as defined in claim 1 wherein in steps (vi) and (v), a normal force and a shear force are determined and said force actuation mechanism transmits said normal force and said shear force to said physical device.

9. A method for providing a haptic interface as defined in claim 1, further including the step, between steps (iv) and (v), of deactivating the force actuation mechanism and proceeding to a next of the plurality of device points if a minimization point on the parametric surface which minimizes the distance between a device point and the parametric surface is an interior point.

10. A method for generating a haptic interface between a physical device and a computer generated parametric surface separating a virtual space into two virtual half spaces, the physical device capable of transmitting forces in at least three degrees-of-freedom via a force actuation mechanism connected thereto and defining a plurality of device points when moved through the virtual space, the method comprising the steps of, for each of the plurality of device points:

(i) deactivating the force actuation mechanism and proceeding to a next of the plurality of device points if a minimization point on the parametric surface which minimizes the distance between a device point and the parametric surface is a boundary point, if the device point is outside of a predetermined elasticity zone around the parametric surface, or if the device point is separated from the parametric surface; and (ii) determining a force to apply to the physical device, activating the force actuation mechanism so as to produce the force at the physical device, and proceeding to a next of the plurality of device points if the device point has moved along the parametric surface, or if the device point has passed through the parametric surface.

11. A method for providing a haptic interface between a physical device and a computer generated parametric surface separating a virtual space into two virtual half spaces, the physical device capable of transmitting forces in at least three degrees-of-freedom via a force actuation mechanism connected thereto and defining a plurality of device points when moved through the virtual space, the method comprising the steps of, for each of the plurality of device points:

(a) determining whether a collision has occurred between a device point and the parametric surface;

(b) determining a force to apply to the physical device if a collision has occurred, activating the force actuation mechanism so as to produce said force at said physical device, and proceeding to step (a) for a next of the plurality of device points; and (c) deactivating the force actuation mechanism if a collision has not occurred and proceeding to step (a) for a next of the plurality of device points.

12. A method for providing a haptic interface as defined in claim 11 wherein a collision is determined to have occurred when either the device point has moved along the parametric surface or passed through the parametric surface.

13. A method for providing a haptic interface as defined in claim 11 wherein a collision has not occurred when a minimization point on the parametric surface is a boundary point, when the device point is within a predetermined elasticity zone around the parametric surface, or when the device point is separated from the parametric surface.

14. A method for providing a haptic interface as defined in claim 11 wherein an oriented distance, defined as a distance between the device point and the parametric surface in which a vector representing said oriented distance is normal to said parametric surface, has a device point sign associated therewith to signify a virtual half plane in which the device point is located, and a previous device point, having a previous device point sign, is the one of the plurality of device points immediately preceding the device point.

15. A method for providing a haptic interface as defined in claim 14 wherein a minimization point is determined by finding a point on the parametric surface which represents the shortest distance between the device point and the parametric surface.

16. A method for providing a haptic interface as defined in claim 14 wherein step (a) further comprises comparing the oriented distance to a predefined elasticity distance, the elasticity zone being a predetermined space within the predefined elasticity distance from the parametric surface on an opposite virtual half space from that of the device point.

17. A method for providing a haptic interface as defined in claim 14 wherein in step (a) a half space indicator flag containing a sign indicating the virtual half space from which the device point was previously in is compared to the device point sign of the oriented distance of the device point.

18. A method for providing a haptic interface as defined in claim 14 wherein the sign of the oriented distance is compared to the sign of an oriented distance of the previous device point to determine whether the device point has moved along said parametric surface.

19. A method for providing a haptic interface as defined in claim 14 wherein in step (b) determination of whether said device point has passed through the parametric surface is accomplished by constructing a line segment between the device point and the previous device point and determining whether the line segment intersects the parametric surface.

* * * * *

UNITED STATES PATENT AND TRADEMARK OFFICE
CERTIFICATE OF CORRECTION

PATENT NO. : 5,694,013
DATED : December 2, 1997
INVENTOR(S) : Paul J. Stewart and Yifan Chen It is certified that error appears in the above-identified patent and that said Letters Patent is hereby corrected as shown below:

On the title page, item [75] Inventor:

"Yihan" should be Yifan. Yifan Chen is the correctly spelled name.

Signed and Sealed this

Twenty-first Day of April, 1998

*Attest:*

BRUCE LEHMAN

*Attesting Officer*      *Commissioner of Patents and Trademarks*